United States Patent [19]
Mogensen

[11] Patent Number: 6,101,766
[45] Date of Patent: Aug. 15, 2000

[54] SANITARY CELL

[75] Inventor: Poul Christen Mogensen, Aarhus, Denmark

[73] Assignee: DaimlerChrysler Rail Systems (Denmark) A/S, Randers, Denmark

[21] Appl. No.: 09/101,689

[22] PCT Filed: Jan. 16, 1997

[86] PCT No.: PCT/DK97/00017

§ 371 Date: Jul. 15, 1998

§ 102(e) Date: Jul. 15, 1998

[87] PCT Pub. No.: WO97/26153

PCT Pub. Date: Jul. 24, 1997

[30] Foreign Application Priority Data

Jan. 19, 1996 [DK] Denmark ................................. 0049/96

[51] Int. Cl.⁷ .............................. B64D 11/02; A47K 3/16
[52] U.S. Cl. .................................. 52/34; 52/64; 52/173.1; 52/79.12; 105/323; 105/238.1; 244/118.5; 244/118.6; 4/661
[58] Field of Search .................................. 52/79.1, 173.1, 52/79.12, 64, 34; 312/228, 237, 209, 278, 279, 229, 246; 244/118.2, 118.5, 118.6, 119, 238.1; 105/315, 323, 337, 338, 345, 382; 4/661, 668, 670; 296/63, 64, 65.1

[56] References Cited

U.S. PATENT DOCUMENTS

| | | |
|---|---|---|
| 2,710,731 | 6/1955 | Bright et al. . |
| 3,480,239 | 11/1969 | Jensen et al. . |
| 4,185,799 | 1/1980 | Richards, Jr. ..................... 244/118.5 R |
| 4,221,441 | 9/1980 | Bain .......................................... 312/228 |
| 4,456,206 | 6/1984 | Tijssen ................................. 244/118.5 |
| 4,493,470 | 1/1985 | Engel .................................... 248/503.1 |
| 5,083,727 | 1/1992 | Pompei et al. ........................ 244/118.6 |
| 5,150,863 | 9/1992 | Hozumi ................................ 244/118.5 |
| 6,007,025 | 12/1999 | Coughren et al. .................... 244/118.6 |

FOREIGN PATENT DOCUMENTS 925932  7/1994  Finland .

*Primary Examiner*—Carl D. Friedman
*Assistant Examiner*—Yvonne M. Horton
*Attorney, Agent, or Firm*—James Creighton Wray; Meera P. Narasimhan

[57] ABSTRACT

A module structure toilet room (1) is disclosed. The toilet room is built from module parts (49–52) containing functional units in the form of a toilet bowl (8), a fecal tank (7), a heat exchanger (61), a water tank (13), etc. Each module has connection conduits with quick release couplings for interconnecting the functional units and means for direct mounting of the module parts on the bearing structure of the train wagon. The module parts also have fixed/releasable coupling means (78) for mounting the fitting elements in the form of wall coverings and the like.

As the functional units may be built and tested before the final mounting in the train wagon (2), considerable savings may be obtained in the mounting time of the train wagon. Furthermore, the module structure enables the toilet room 1 to be used in several different types of train wagons (2). Furthermore, servicing may be accomplished easily as the functional units are built together and may easily be jointly replaced.

10 Claims, 6 Drawing Sheets

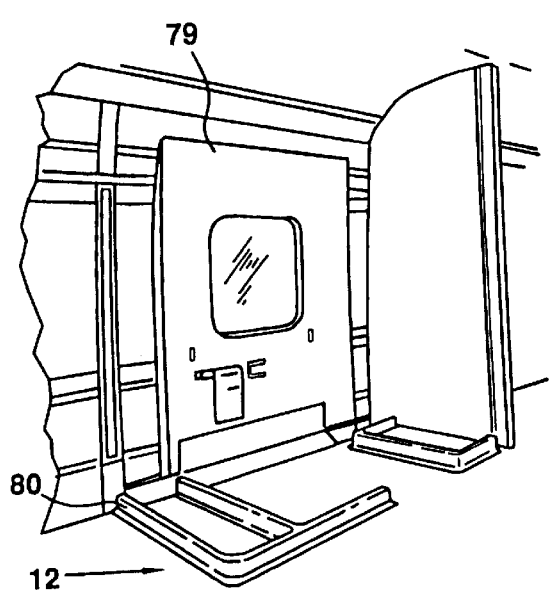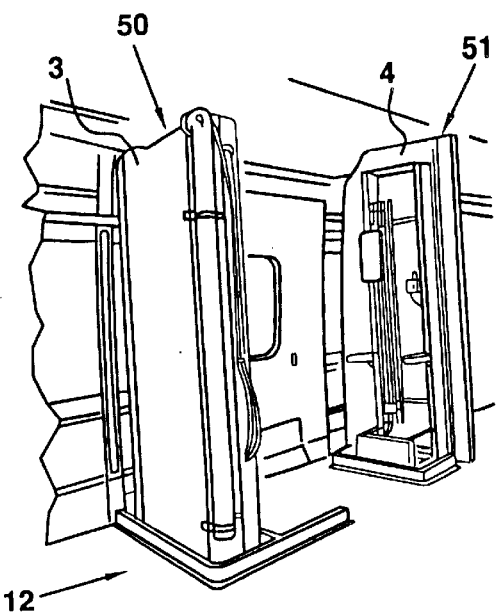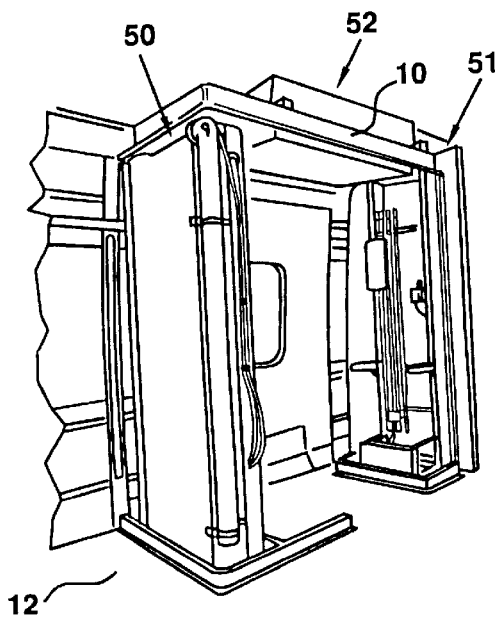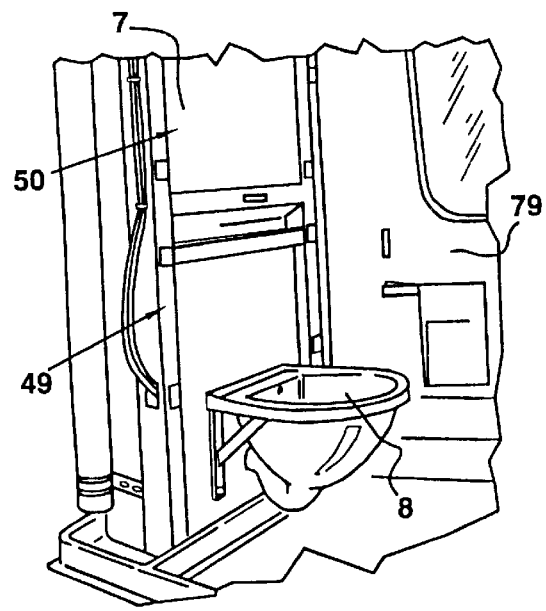

SANITARY CELL

BACKGROUND OF THE INVENTION

The present invention relates to a sanitary cell for mounting on a bearing structure of crafts and comprising frame elements, functional units, connection conduits having coupling members for connection with the fixed installation conduits and/or functional elements of the craft and fitting elements.

The present application particularly relates to sanitary cells in the form of toilet rooms for mounting in crafts in the form of train wagons. However, the invention will also be applicable in combination with other kinds of sanitary cells in other kinds of crafts.

Thus, the invention also relates to sanitary cells in the form of shower rooms, kitchen rooms and other rooms with technical installations designed to be mounted in crafts for transport by sea, on land and in the air, such as ships, busses and aeroplanes.

Thus, the invention may advantageously be used in all crafts in which a large part of the craft construction has been completed before the mounting of the sanitary cell is initiated. However, the invention and the advantages obtained by it will subsequently only be described with reference to the building of toilet rooms in train wagons.

When building train wagons, one would first mount a wagon frame with wheels and installations related thereto. Next, the outer enclosure in the form of outer walls, floor and ceiling as well as the fixed installation conduits are mounted therein. Then the inside furniture and room partitions as well as the installations that are necessary therein are mounted. So far toilet rooms have been mounted as one of the last things. It has been normal so far for 3 to 5 different trades to work with the mounting and for the total mounting time to extend over 2 to 3 weeks.

This is disadvantageous in several respects.

Thus, mounting takes place in such a manner that the trades in several turns accomplish a partial mounting of the functional units or fitting elements falling within their field of trade. The mounting time is consequently very dependent on a tight and precise control of the partial mountings of the individual trades. If a single, in itself minor, mounting operation is delayed, it will make a subsequent mounting operation impossible or cause considerable delay for it. Therefore, even minor deviations or delays may have considerable influence on the total mounting time of the toilet room and consequently on the time of delivery.

The toilet room is built up as an integral assembled part of the train wagon. Due to the tolerances involved in building it is necessary to perform an individual adaptation of many components. This is very time-consuming, and such individual adaptation may further give rise to considerable delay in subsequent mounting operations.

The fitting elements will often be mounted in an initial stage as they serve as full or partial support of functional units and/or connection conduits. As a major part of the fitting elements is composed of thin cover plates, a damage to these frequently occurs during subsequent mounting of unhandy and heavy elements such as frame profiles, toilet bowl, pipes and the like. This has made time-consuming replacements necessary, wherein there may also have been a need for the cooperation of several trades in dismounting and remounting.

As mentioned, the fitting elements are thin cover plates. In use they are exposed to a load that may cause them to be broken and to require frequent replacements. As the fitting elements serve as full or partial support of technical installations, such subsequent replacement will make it necessary for the train wagon to be taken out of operation for a long period. Thus, there will be a frequent need for dismounting several elements that require the cooperation of several trades. This is obviously time-consuming and costly.

As the toilet room is constructed as an integral part of the train wagon, and since the fitting elements and technical installations are built together, it requires quite considerable storage capacities to be able to produce train wagons with the various requirements made on the type of cover plates, different types of toilet and washing bowls, mirrors, doors and other fitting equipment. The integral construction and the large degree of adaptation to the train wagon in question makes it almost impossible to prefabricate parts of the toilet room.

Furthermore, it is necessary to provide individual toilet rooms for different types of trains, and it is also necessary to adapt the toilet room depending on its position in the train wagon. This leads to demands on the storage capacity, and the individual adaptation makes it difficult to obtain a rational and quick mounting of the toilet rooms.

As the mounting of the functional units takes place in partial mountings, a test of these functional units cannot be performed until after a final mounting of the entire toilet room. If malfunctions occur during these tests, any replacement can only take place after time-consuming dismounting and remounting. Thus, this will cause an undesired delay in delivery.

As the mounting of the toilet room is performed during the final stage of building a train wagon, the mounting time is often decisive for the time of delivery. Since at this moment very large values are tied up in the almost finished train wagon, it is desired for financial reasons to deliver it as soon as possible. Thus, a desire to reduce the mounting time as much as possible has existed for several years. Despite this, satisfactory solutions have not previously been proposed.

There have been proposals for modular building of toilet rooms for mounting in crafts such as trains and aeroplanes. Examples of this are known from DE-OS-42 33 551, DE-OS-43 09 050, DE-OS-43 36 418 and U.S. Pat. No. 5,083,727, among others.

These patent publications propose the use of modules that can be prefabricated and subsequently mounted in the craft. However, no directions are given as to how these modules should be constructed to reduce the mounting time and service time as much as possible. In the publications, e.g. U.S. Pat. No. 5,083,727, which is considered as the closest prior art disclosing the features mentioned by way of introduction, it is described that a module construction unit may be replaced quickly in the case of malfunctions. It is disclosed that functional units are connected with the fixed installation conduits through coupling members. Accordingly, it is possible to dismount the unit from the craft. However, a quick replacement of the unit will not be possible since the craft in which units are placed have accesses with a limited size. Thus, it will be necessary to disassemble a unit in order to take it out or in through the doors of train wagons and/or flight cabins. Thus, the publications do not teach the building of sanitary cells that remedy the disadvantages associated with the known sanitary cells. Only a general description of a possible modular building of a sanitary cell known per se is given.

The object of the present invention is to remedy the above-mentioned disadvantages of known sanitary cells by disclosing a structure in which the functional units may be tested prior to mounting, and which is quickly mounted in a craft, and which is quickly serviced, and which may easily be adapted to different types of crafts as well as the needs of different customers.

This object is obtained according to the present invention by a sanitary cell of the type mentioned in the introduction, which is characterised in that said coupling members are quick release coupling members, that the functional elements have means for direct mounting on the frame elements and are assembled with the latter for the formation of module parts, which are substantially plane, and which have means for mutual assembly of these and for direct mounting of the module parts on the bearing structure of the craft, that the module parts also have means for mounting of the fitting elements on the frame formed by the module parts, and that the frame of a sanitary cell formed by the module parts has a box-shaped outer contour.

As module parts are formed, which contain functional units or a group of functional units, it is possible to perform a test of the ability to function prior to mounting in the craft in question. Therefore, it is possible to avoid the risk of malfunctions in the functional units mounted in the craft and consequently also the risk of a time-consuming dismounting, error correction and remounting. A test of the completely mounted sanitary cell is very simple and fast and substantially exclusively serves to ensure that all connection conduits have been connected. If a few conduits have not been connected, no time-consuming dismounting of elements is required. In general, an error correction may take place simply by removing a fitting element, establish a connection and then remounting the fitting element.

It is possible to place the technical installations to be serviced frequently in one and the same module part. This facilitates servicing. Any replacement may easily be accomplished without the need to take the craft out of operation for long periods. In case of a malfunction in the functional unit, an erector may dismount the module part in which there are malfunctions and remount a new module part, which has been brought. Then a correction of malfunctions of the defective module part may take place in a workshop. It is easy to take the module part out through doors with a limited size. Seeing that each module part is substantially plane it is possible to dismount such module part and not a total unit from the bearing structure and the other module parts and to remove it from the craft through doors even if they have a limited size, e.g. as in air crafts.

As the functional units are mounted directly on the frame elements by the means for that purpose, it is possible to mount the fitting elements as the very last and thus avoid the risk of damaging them. This provides much freedom of choice of different designs of the fitting elements depending on the wishes of the individual customer. Thus, it is possible to mount large series of technical module parts, which may be mounted in different crafts with the fitting elements required/desired in the craft in question. E.g. it will be possible to use the same module parts in different types of train wagons and, likewise, it is also possible to use the same module parts in trains, busses, aeroplanes and ships.

As the frame of the sanitary cell has a box-shaped outer contour, it may be used in crafts irrespective of the profile of its enclosure. Thus, it will be simple to form connections towards walls and ceilings by the use of fitting elements. These fitting elements against walls and ceilings will consequently also be the only elements needing individual adaptation to the craft. However, the adaptation is easy as it often concerns relatively thin covering plates, which may easily be cut/formed with the desired contour for contact against the enclosure of the craft.

It is possible to build the module parts of the sanitary cell concurrently with building the craft in which they are to be mounted. Thus, it will be possible to produce the enclosure of the craft and then bring the module parts into the craft through its door openings in the final stage of final mounting of craft furniture, room partitions, etc. Thus, it is possible to form the sanitary cell from very few module parts, which may be mounted by erectors who need not have particular professional skills. It is only required for the erector to be able to erect the module parts, connect them with each other and with the bearing structure by the means formed for that purpose. These connection means may be very simple and means known per se. E.g. screw connections, nail connections, pin connections or hook connections may be used. Fixed or releasable connection means may be used. The functional units are connected simply and quickly via quick release coupling members. These may be arranged with colour codes or different shapes in order to make faulty mounting impossible.

If a fitting element is damaged or its replacement is desired, this may take place without the need to take the craft out of operation. A erector may simply dismount an element from the module part and remount a new one. The means for mounting the adaptation elements on the module parts are preferably releasable coupling means, e.g. in the shape of catches, VELCRO connections or the like. There will be no need for intervention in the functional units or connection conduits between them and/or the fixed installation conduits of the craft, which are only assembled with the frame elements.

With a sanitary cell according to the invention and in the form of a toilet room for train wagons it has proven possible in practice to reduce the mounting time in the train wagon from 2–3 weeks to about 8 hours. In the mounting it has merely been required to use erectors. Thus, there has been no need to co-ordinate the work of several trades.

DESCRIPTION OF THE DRAWING

The invention will now be described in further detail with reference to the accompanying drawing, which shows a specific embodiment of the sanitary cell in the form of a toilet room for a train wagon, and wherein FIGS. 9–16 show perspective views to illustrate the mounting steps of building the toilet room shown in FIG. 4.

In FIGS. 1 and 2, 1 designates a toilet room arranged in a train wagon 2. As appears from FIG. 2, the toilet room comprises a first wall frame 3 and a second wall frame 4 positioned opposite each other in the longitudinal direction of the train wagon 2, and a third wall frame 5 provided with a door 6 and extending in a plane substantially parallel to the longitudinal direction of the train wagon 2. At the first wall frame 3 a faecal tank 7 and a toilet bowl 8 are provided. At the opposite wall frame 4 a wash basin 9 is provided. The wall frame 4 further comprises heat exchanger, climate surveillance equipment and other sanitary equipment, which will be described further below.

Figure 1:
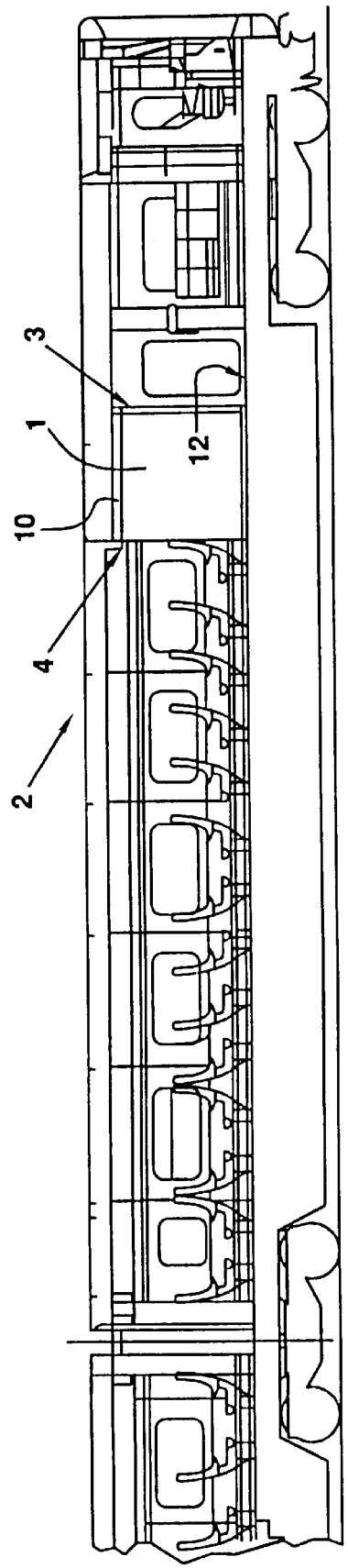
FIG. 1 shows a side view of a train wagon containing a toilet room.

The toilet room further comprises a ceiling frame 10, which is indicated schematically in FIG. 1. Mounted in the ceiling frame 10 are a water tank and a ventilation unit, which will be described further below. The toilet room 1 is delimited at its fourth side by the lateral wall 11 of the train wagon 2.

Figure 3:
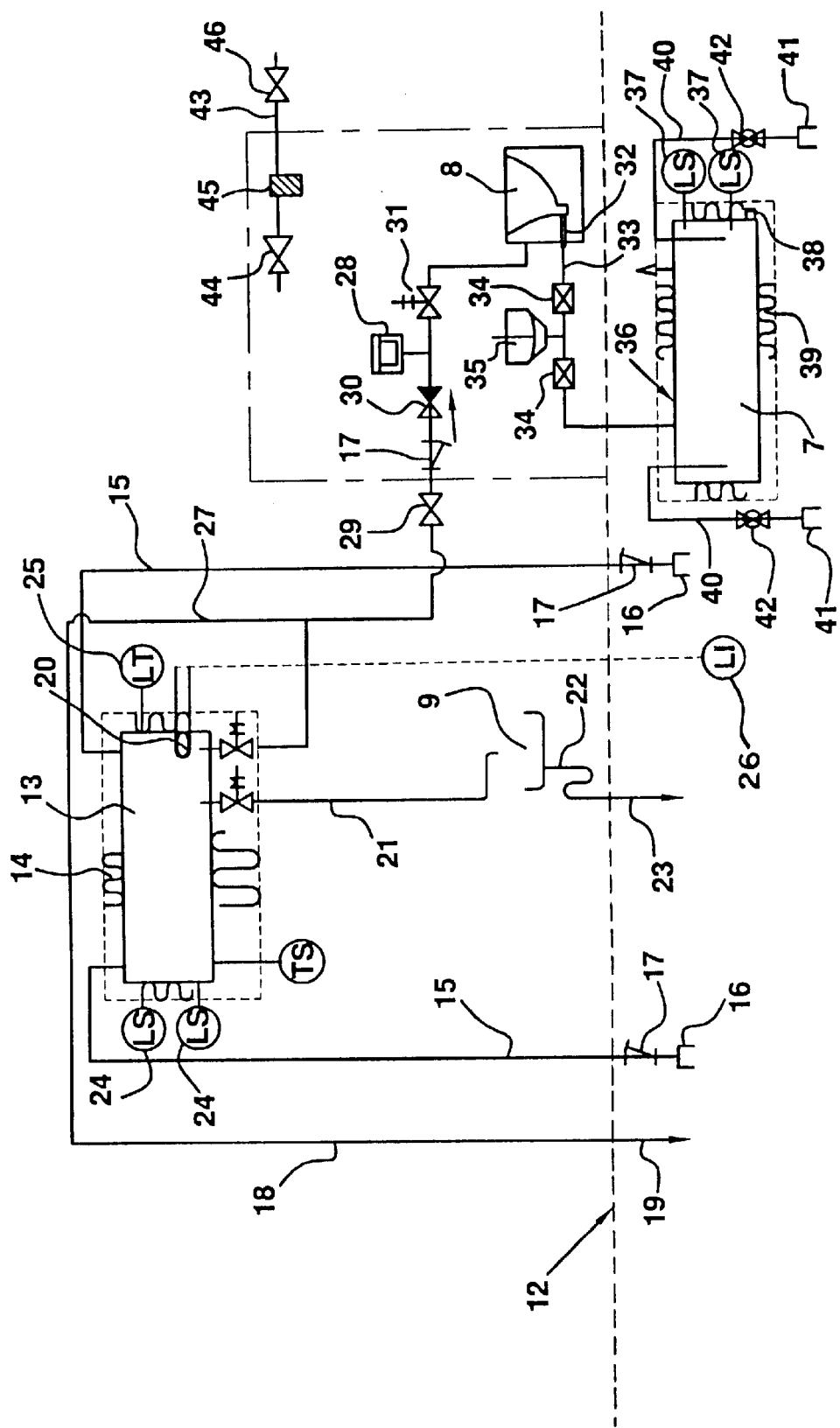
FIG. 3 shows a flowchart of functional units and connection conduits forming part of a toilet room according to the invention.

FIG. 3 shows a flowchart of the water and toilet system forming part of the toilet room 1. A broken line 12 indicates the level of the wagon bottom of the train wagon 2. FIG. 3 shows the elements forming part of the water and toilet system of the toilet room. However, the individual functional units will be built into module parts to be explained further with reference to the succeeding FIGS. 5–8.

Figure 2:
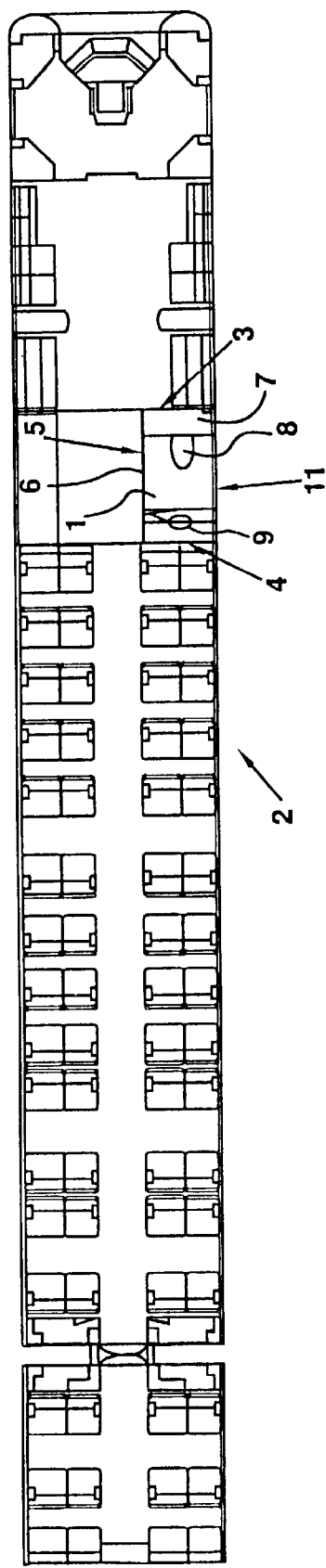
FIG. 2 shows a view of the train wagon shown in FIG. 1, seen from above.

In FIG. 3 the faecal tank 7 is shown in a position under the wagon bottom 12. However, in a toilet room 1 according to the invention it is preferred for the faecal tank 7 to be positioned in the first wall frame 3, such as illustrated in FIG. 2.

A water tank 13 arranged in the ceiling frame 10 is arranged in an insulating enclosure 14. The water tank 13 is connected with a connection conduit 15 having at its free end a quick release coupling 16, which is designed to cooperate with a corresponding quick release coupling in the fixed water installation of the train wagon. Arranged in the connection conduit 15 is a dust collector 17. The water tank 13 is further connected with an overflow conduit 18. At its free end the overflow conduit 18 is connected with a quick release coupling 19 for connection to the fixed installations of the train wagon. A heating element 20 is mounted in the water tank 13. A connection conduit 21 leads water to the basin 9. The basin 9 is provided with a stench-trap 22, which in turn is connected with a connection conduit having at its free end a quick release coupling 23 for connection to the fixed drain installations in the train wagon. The water tank 13 is connected with level switches 24, which automatically keep a certain water level in the water tank 13. A level transmitter 25 sends a signal to a level indicator 26 arranged in a position for easy reading.

A feeding conduit 27 is arranged between the water tank 13 and the toilet bowl 8. Arranged at a suitable position in this connection conduit 27 are quick release coupling members (not shown). A water pressure increaser 28 is inserted in the feeding conduit 27. Also inserted in the connection conduit 27 are a reduction valve 29, a stop valve 30 and a magnetic valve 31. The outlet 32 of the toilet bowl 8 is connected with a connection conduit 33. Arranged in the connection conduit 33 are discharge valves 34 and a discharge pump 35. Cooperating quick release coupling members (not shown) will be provided in the connection conduit 33 in a position between the outlet 32 of the toilet bowl and the inlet 36 of the faecal tank 7.

The faecal tank 7 is provided with level sensors 37 and an inspection and cleaning pipe 38. The faecal tank 7 is arranged in an insulating enclosure 39. The faecal tank is provided with a discharge conduit 40, which is provided at its free end with a quick release coupling 41, which cooperates with a corresponding quick release coupling in the fixed installation of the train for faecal discharge. A ball valve 42 is inserted in the discharge conduit 40.

The toilet room is provided with a source of compressed air (not shown), which operates at a pressure of approximately 8 to 10 bars. The connection runs via a connection conduit 43 in which a reduction valve 44 is inserted to reduce the pressure to approximately 5 bars. Also inserted in the connection conduit 43 are a filter 45 and a shut-off valve, which is built together with a quick release coupling (not shown) cooperating with the fixed compressed air installations in the train wagon. The compressed air installations are connected with the other units of the water and toilet system in a manner known per se.

Figure 4:
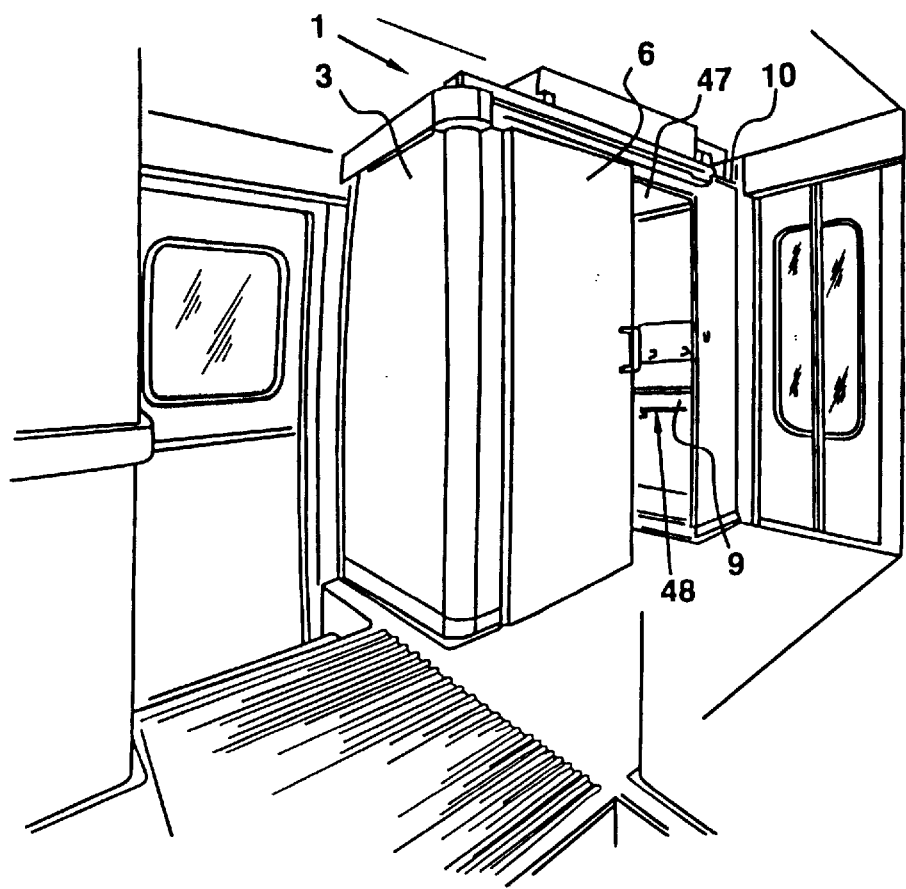
FIG. 4 shows a perspective view of a toilet room according to the invention arranged in a train wagon.

FIG. 4 shows the toilet room 1. The door 6 is in an open position and through the doorway 47 one sees the wash basin 9, which is mounted in a tabletop 48. The toilet bowl 8 is mounted on the first wall frame 3 in a position not visible in FIG. 4.

Figure 5:
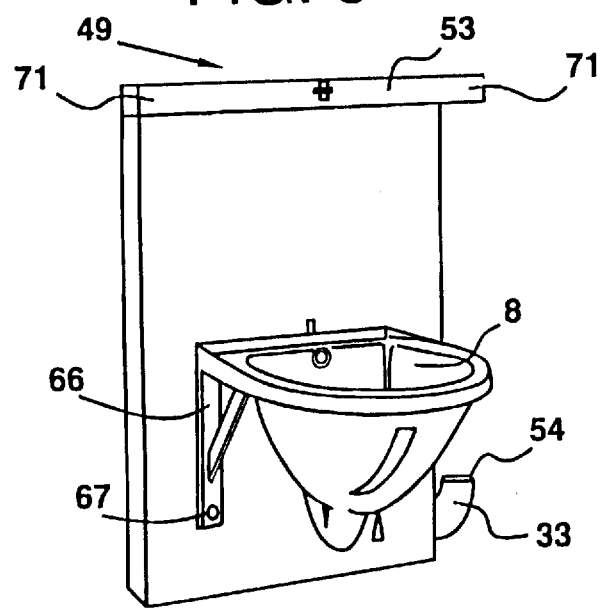
FIGS. 5–8 show module parts forming parts of a toilet room according to the invention.
Figure 6:
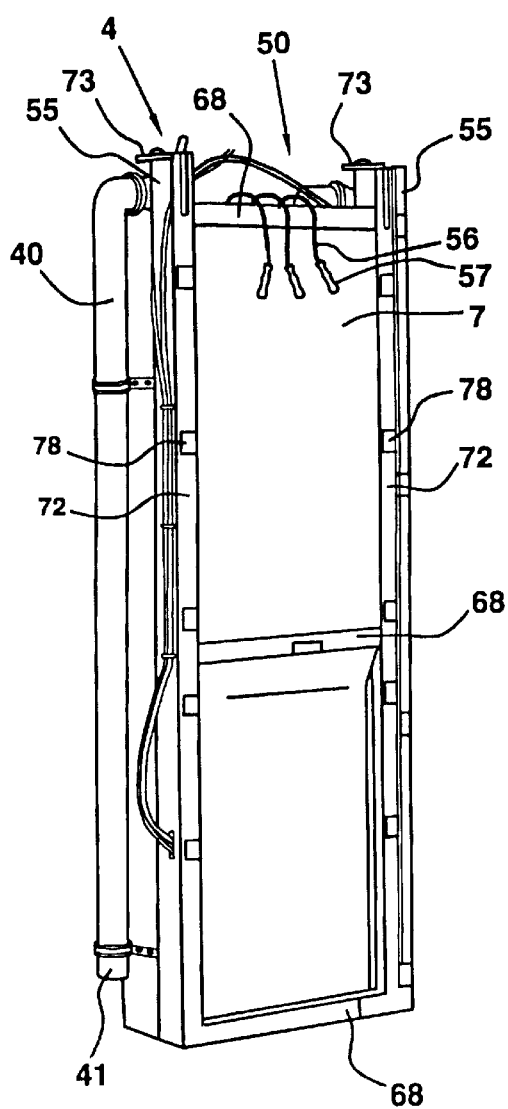
Figure 7:
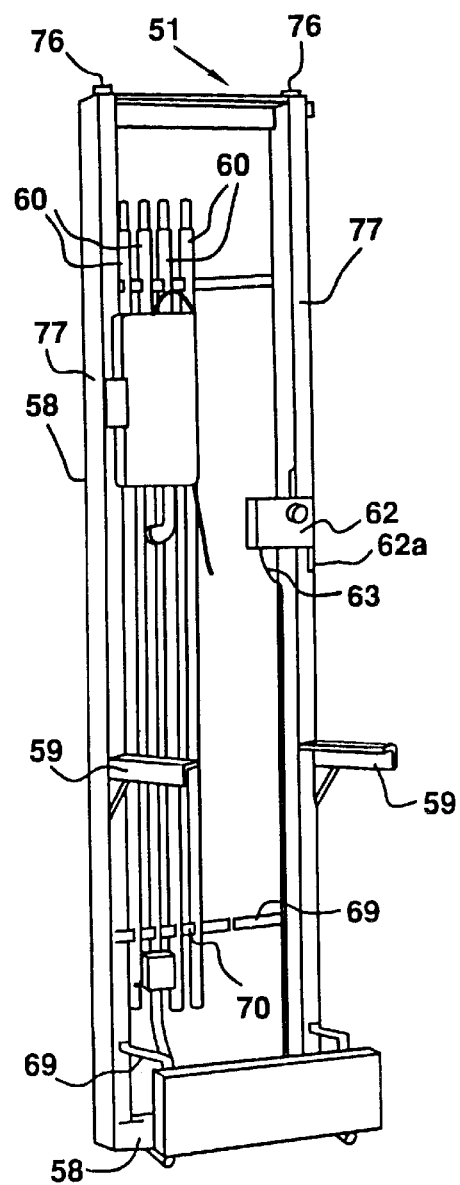
Figure 8:
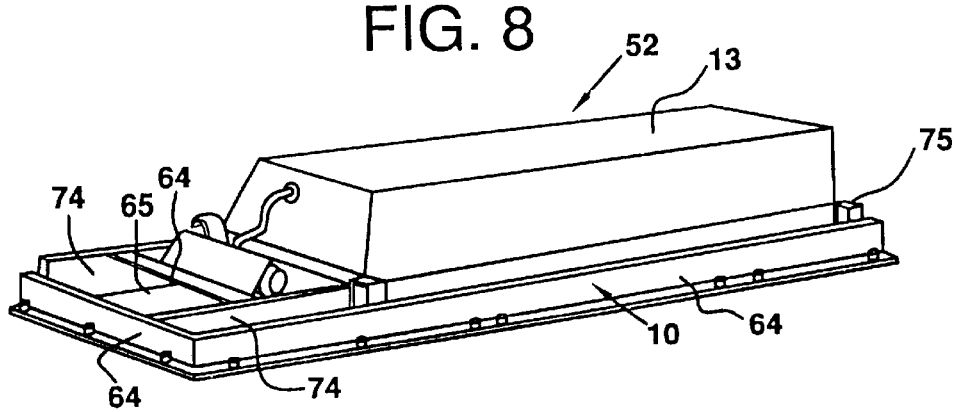

FIGS. 5–8 show a module part forming part of the erection of the toilet room 1. FIG. 5 shows a first module part 49, FIG. 6 shows a second module part 50, FIG. 7 shows a third module part 51, and FIG. 8 shows a fourth module part 52.

The first module part 49 comprises frame elements 53 in the form of a plate on which the toilet bowl 8 is mounted directly. At the rear of the frame element 53 the necessary technology for the functioning of the toilet bowl is built in. At the bottom right corner one sees a quick release coupling 54 mounted in the connection conduit 33. The quick release coupling 54 is designed for connection with a quick release coupling positioned on the remaining part of the connection conduit 33, which leads to the inlet 36 of the faecal tank 7.

The second module part 50 comprises the faecal tank 7, which is mounted in frame elements 55. At the top of the faecal tank one sees connection conduits 56 of level sensors 37. Quick release couplings 57 are provided at the free ends of connection conduits 56. One also sees the discharge conduit 40 and the quick release coupling 41 designed for connection with the fixed installation for faecal discharge of the train.

The third module part 51 is a so-called sanitary module. It comprises frame elements 58. The frame also comprises two shelf brackets 59 designed to support the tabletop 48. The third module part 51 comprises a number of fixed connection conduits 60, a heat exchanger 61, an electronics box 62 comprising climate surveillance equipment in the form of sensors of water and air temperature. The electronics box 62 also comprises sensors to survey correct functioning of the compressed air system. The electronics box is connected via connection conduits 63 with the fixed surveillance system of the train wagon via quick release couplings (not shown).

The fourth module part 52 comprises the water tank 13, which is mounted in frame elements 64 forming the ceiling frame 10. The ceiling frame 10 comprises an opening 65 designed for mounting a ventilator (not shown) which always maintains a lower pressure in the toilet room than in the surrounding rooms.

Only the most important elements are shown in the four module parts 49–52. Thus, the module parts comprise more elements in order to be fully functional. However, such elements will be well-known to a person skilled in the art and for simplicity are not shown.

The frame elements and the functional units are provided with means for direct assembling of the same for the formation of the four module parts. As an example of these means one sees in FIG. 5 a bracket 66 for the toilet bowl 8, which is fastened to the frame element 53 via screw connections. It is seen in FIG. 6 that the frame elements 55 comprise transverse braces 68 onto which the faecal tank 7 may be screwed by means of screws (not shown). In FIG. 7 one sees braces 69 with fastening blocks 70, which are used for fastening connection conduits 60 and the heat exchanger 61. It is also seen that the electronics box 62 is screwed onto the frame element 58 via a flange 62a. In FIG. 8 one sees the water tank 13 arranged in the frame element 64. The mutual connection is established by screwing by means of screws not shown.

It is noted that any suitable means known by a person skilled in the art may be used for the mutual assembly of the frame elements and functional units.

It is seen that having been assembled, the module parts will form a frame of the toilet room so that it has a box-shaped contour. Since each of the module parts 49–52 has straight outer sides, the outer contour of the formed toilet room will not be dependent on the contour of the train wagon. Adaptation to the contour of the train wagon takes place in a simple manner by means of fitting elements.

The first module part 49 is designed for mounting on the lower half of the second module part 50. Alternatively these two module parts might be assembled for formation of a single module part comprising both the toilet bowl 8 and the faecal tank 7. The module parts are provided with flanges for mutual assembly. Thus, the module part 49 has flanges 71 designed to be screwed onto the vertical braces 72 of the module part 50, which form part of the frame elements 55. At their upper side the braces 72 have flanges 73 designed to cooperate with flanges 74 on the ceiling frame 10. The ceiling frame 10 also has mounting flanges 75 designed to cooperate with mounting flanges 76 at the upper end of vertical braces 77 forming part of the frame elements 58 in the third module part 51.

The frame elements in the different module parts also have means for mounting fitting elements. As an example, such means are shown in FIG. 6 in the form of one part of VELCRO elements 78 designed to cooperate with corresponding VELCRO elements on the fitting elements. In FIG. 7 the shelf brackets 59 are shown as an example of means for mounting a fitting element in the form of the tabletop 48. Other means, which will be well-known to a person skilled in the art, may also be used for assembly of the frame elements and the fitting elements.

Each of the module parts 49–52 is a unit that may be produced and tested at the supplier's before coupling with the other module parts in the train wagon 2. The connection conduits between the different module parts are designed as service connections with quick release couplings. When all module parts 49–52 have been mounted in the train wagon 2, they may in principle be connected and tested together with the fixed installations of the train for electronic control, for supplies of power, air, water, for ventilation and for faecal discharge. Thus, it will be possible easily and quickly to perform any correction since all functional units are easily accessible. It will also be possible to stop the mounting of the toilet room 1 at this stage if this is desired. This may be the case if it is desired to mount the fitting elements at a later point of train wagon mounting. The advantage of this may be that the mounting of expensive and fragile fitting elements in the form of interior panels may be deferred to a time when the heavier mounting of the remaining part of the train wagon 2 has been completed.

Below an explanation of the order of mounting in building the toilet room 1 shown in FIG. 4 is given.

For practical reasons a fitting in the form of a side wall covering 79 on the two outer sides of the train wagon is mounted first. This mounting takes place according to principles known per se, e.g. by means of VELCRO elements 78. Then a base 80 is placed on the wagon bottom 12, thus establishing in a simple manner a security that the subsequent module parts are positioned correctly. The module part 50 and the module part 51 are mounted to form the two wall frames 3, 4. Then the module part 52 forming part of the ceiling frame 10 in the toilet room 1 is mounted. The module parts are fastened mutually to the train wagon floor 12, side wall and ceiling. At this point the frame of the toilet room is defined statically.

As shown in FIG. 12, the module part 49 is then mounted on the module part 50. At this point all functional units have been mounted. The mutual connection thereof and the connection to the fixed installation of the train may also be accomplished at this point.

Figure 13:
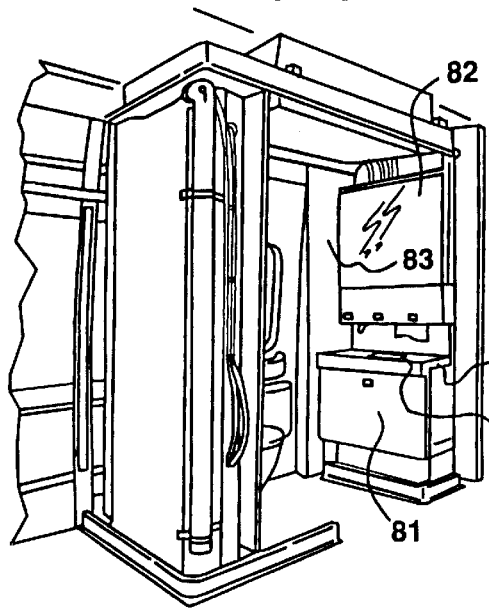

It is seen from FIG. 13 that first fitting elements in the form of the tabletop 48 containing the wash basin 9, cabinet coverings 81 and a mirror 82 are mounted. Also seen in FIG. 13 is a fitting element 83 shaped with an outer contour according to the sides of the train wagon. The fitting element 83 (and a corresponding fitting element at the opposite wall) is what establishes the fitting of the toilet room 1 towards the side wall covering 79. The fitting element 83 (and a corresponding opposite fitting element) is designed for displacement along the side of the toilet room 1 in a direction parallel to the outer wall of the train wagon 2. Due to this parallel displacement the fitting element 83 may be slid between the box-shaped outer contour of the toilet room 1 and the side wall covering 79. Any replacement of the side wall covering 79 may easily be accomplished by an opposite parallel displacement of the fitting element 83.

Figure 14:
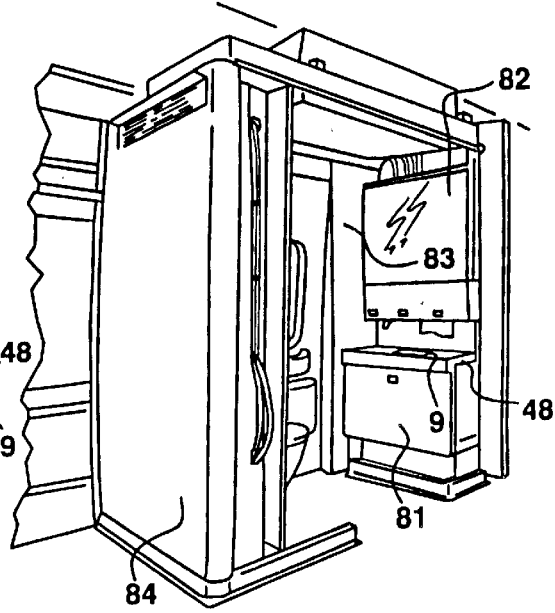
Figure 15:
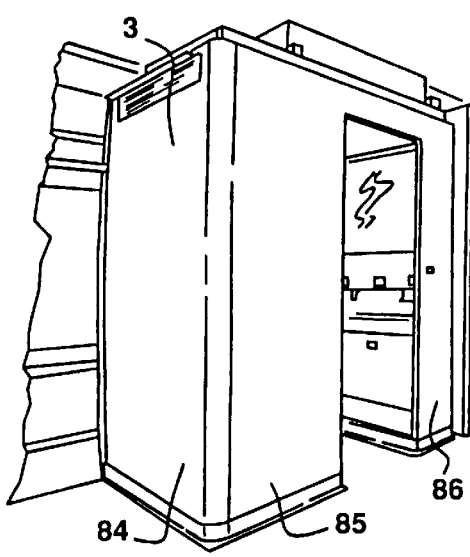

It is seen from FIG. 14 that fitting elements in the form of a cover plate 84 on the wall frame 4 is mounted. It is seen from FIG. 15 that further fitting elements in the form of cover plates 85 and 86 are mounted. At this point of mounting cover plates are also mounted externally on the side wall frame 4 (not visible).

Figure 16:
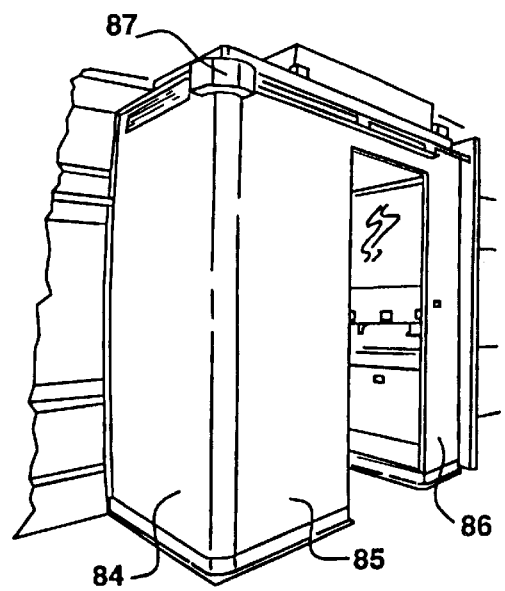

Then a door machine 87 is mounted, such as shown in FIG. 16. All that remains after this is mounting the door 6 itself in order to complete the mounting of the toilet room 1, which now appears as shown in FIG. 4.

What is claimed is:

1. A sanitary cell adapted for removably mounting on a bearing structure of crafts and comprising a box-shaped housing, plural modular units fitted together to form the housing, connection conduits for connecting the modular units to conduits of the crafts, quick release coupling members for connecting the plural modular units with fixed installation conduits and functional and fitting elements of the craft, mounting means on each modular unit for direct mounting on adjacent modular units forming substantially planar structures after mutual assembly of the modular units, and said mounting means being adapted for direct mounting of the modular units on the bearing structure of the craft.

2. The sanitary cell of claim 1, wherein the modular units form plural wall and ceiling frames of the sanitary cell.

3. The sanitary cell of claim 2, wherein the sanitary cell is a toilet.

4. The sanitary cell of claim 3, further comprising functional units in each modular unit.

5. The sanitary cell of claim 4, wherein the functional units comprise a toilet bowl and a faecal tank on a first wall frame, a heat exchanger and a climate surveillance equipment having sensors for water and heat temperatures on a second wall frame, and a water tank and a ventilation unit in the ceiling frame.

6. The sanitary cell of claim 5, wherein the first wall frame is formed by two modular units comprising the faecal tank and the toilet bowl, respectively, and further comprising vacuum technology for controlling toilet operation in the same modular unit as the toilet bowl.

7. The sanitary cell of claim 1, wherein the fitting elements for fitting the sanitary cell against an outer wall of the craft are displaceable along a side of the sanitary cell extending parallel with said outer wall of the craft.

8. The sanitary cell of claim 2, wherein the plural wall frames form opposite walls of the sanitary cell, and wherein two of the wall frames are interconnected by the ceiling frame.

9. The sanitary cell claim 1, wherein the means for mounting on the modular units are releasable coupling means.

10. The sanitary cell of claim 1, further comprising a base adapted for mounting on a floor of the craft for receiving and correctly positioning the modular units.

* * * * *